(12) United States Patent
Ito

(10) Patent No.: US 11,940,301 B2
(45) Date of Patent: Mar. 26, 2024

(54) POSITION INDICATOR

(71) Applicant: Wacom Co., Ltd., Saitama (JP)

(72) Inventor: Masamitsu Ito, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/176,990

(22) Filed: Mar. 1, 2023

(65) Prior Publication Data
US 2023/0204391 A1 Jun. 29, 2023

Related U.S. Application Data

(63) Continuation of application No. PCT/JP2021/029710, filed on Aug. 12, 2021.

(30) Foreign Application Priority Data

Sep. 4, 2020 (JP) ................................ 2020-148971

(51) Int. Cl.
*G01D 5/20* (2006.01)
*G01L 1/14* (2006.01)
*G06F 3/0354* (2013.01)

(52) U.S. Cl.
CPC ............ *G01D 5/2066* (2013.01); *G01L 1/144* (2013.01); *G06F 3/03545* (2013.01)

(58) Field of Classification Search
CPC ... G01D 5/2066; G01L 1/144; G06F 3/03545; G06F 3/0383; G06F 3/046
See application file for complete search history.

(56) References Cited

U.S. PATENT DOCUMENTS

| | | |
|---|---|---|
| 2011/0219892 A1 | 9/2011 | Fukushima et al. |
| 2013/0199311 A1 | 8/2013 | Horie et al. |

(Continued)

FOREIGN PATENT DOCUMENTS

| | | |
|---|---|---|
| JP | 2011186803 A | 9/2011 |
| JP | 2013161307 A | 8/2013 |

(Continued)

OTHER PUBLICATIONS

International Search Report, dated Nov. 9, 2021, for International Application No. PCT/JP2021/029710. (5 pages) (with English translation).

*Primary Examiner* — Md Saiful A Siddiqui
(74) *Attorney, Agent, or Firm* — Seed IP Law Group LLP

(57) ABSTRACT

Provided is a position indicator of an electromagnetic induction type including a position indicator cartridge housed in a hollow portion of a housing, in which the position indicator cartridge includes a first resonant circuit including a first coil wound around a magnetic core arranged on one end of the position indicator cartridge in an axial direction of the position indicator cartridge and a first capacitor, a second coil that is independent of the position indicator cartridge provided outside of the position indicator cartridge, at a position where the second coil, in operation, is magnetically coupled to the first coil of the position indicator cartridge, and a switch turned on and off by an operation portion provided outside of the position indicator cartridge, the operation portion, in operation, receiving an operation of a user, and a closed circuit including the second coil is formed when the switch is turned on.

16 Claims, 10 Drawing Sheets

(56) References Cited

U.S. PATENT DOCUMENTS

| | | | |
|---|---|---|---|
| 2013/0271431 A1* | 10/2013 | Besperstov | G06F 3/03545 |
| | | | 345/179 |
| 2016/0154528 A1* | 6/2016 | Ahn | G06F 3/0441 |
| | | | 345/174 |
| 2016/0378211 A1 | 12/2016 | Kim | |
| 2017/0097724 A1* | 4/2017 | Kobori | G06F 3/046 |
| 2018/0024657 A1 | 1/2018 | Ninomiya et al. | |
| 2020/0167012 A1* | 5/2020 | Jung | G06F 3/038 |

FOREIGN PATENT DOCUMENTS

| | | | |
|---|---|---|---|
| JP | 5869193 B1 | 2/2016 | |
| JP | 2018018149 A | 2/2018 | |

\* cited by examiner

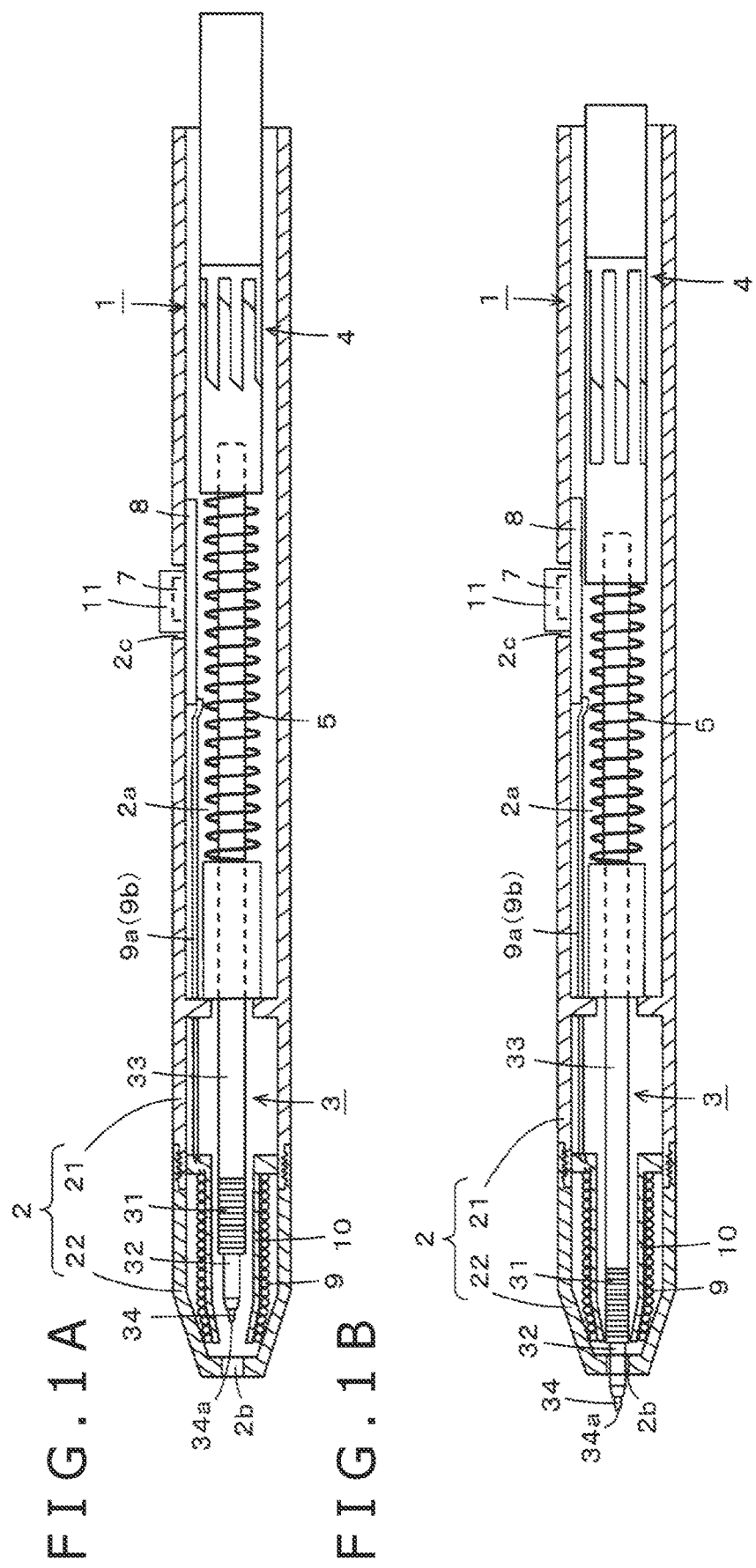

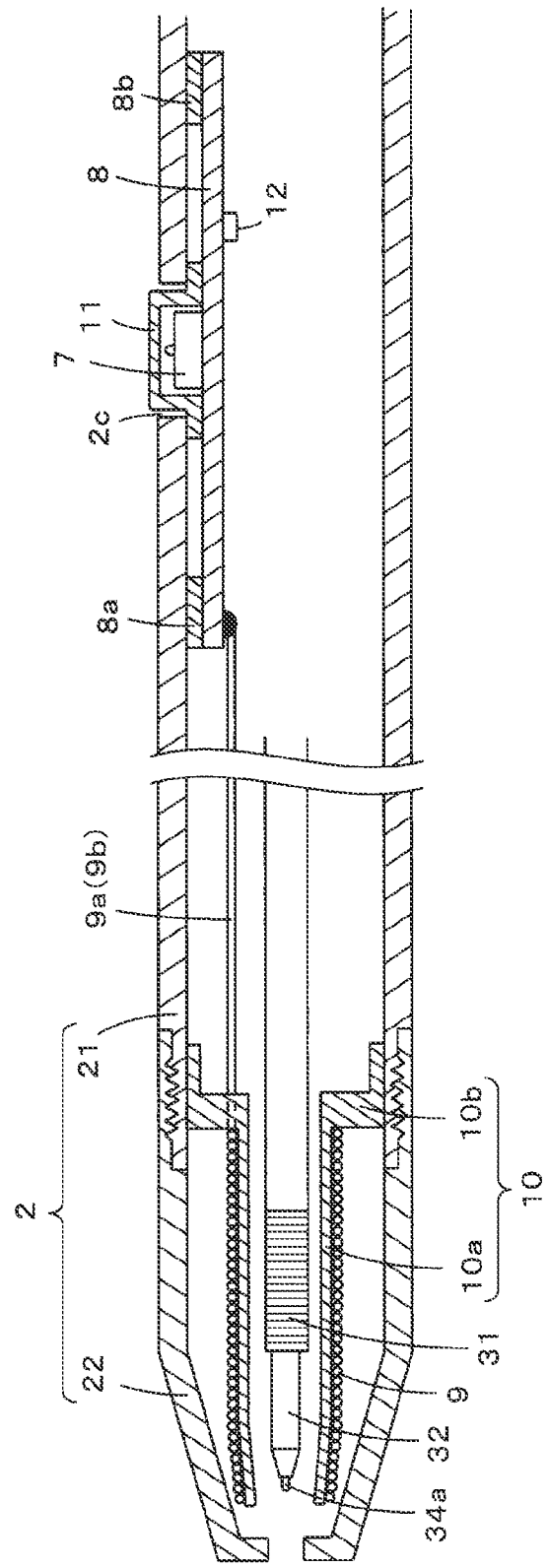

POSITION INDICATOR

BACKGROUND

Technical Field

The disclosure relates to a position indicator of an electromagnetic induction type in which a position indicator cartridge is housed in a hollow portion of a housing.

Description of the Related Art

Preference for miniaturization in recent years has caused a strong demand for further miniaturization of a portable electronic apparatus as well. A position indicator, such as an electronic pen, that indicates a position through interaction of signals with a position detection sensor mounted on the electronic apparatus is used as an input device of a small portable electronic apparatus of this type.

A thinner position indicator of this type is demanded in association with the miniaturization of electronic apparatuses. Recently, the position indicator, such as an electronic pen, is considered as an extension of stationery, and there is also a request for forming a module of the internal configuration of the position indicator to allow the position indicator to be handled similarly to a refill (or cartridge) of a ballpoint pen.

In view of the circumstances, there is provided a position indicator for which a module of the internal configuration is formed and that can be handled as a cartridge component (for example, see Japanese Patent No. 5869193). Hereinafter, internal constituent components of the position indicator formed into a module and integrated to allow the module to be replaced like a refill of a ballpoint pen will be referred to as a position indicator cartridge in the specification.

The position indicator cartridge disclosed in Japanese Patent No. 5869193 is a position indicator cartridge of an electromagnetic induction type. A magnetic core around which a coil is wound is provided on a front end side that interacts with a position sensor, and a circuit board provided with a capacitor that is connected to the coil and that is used for forming a resonant circuit is provided in a cylindrical body portion coupled to the magnetic core.

In Japanese Patent No. 5869193, a housing of the position indicator is provided with an opening on one end side in the axial direction that is a front end side of the position indicator cartridge. The housing is also provided with a knock-type mechanism that can push in and out a front end portion of the position indicator cartridge through the opening.

According to the position indicator, the magnetic core and the cylindrical body portion included in the position indicator cartridge can be thinned to miniaturize the entire position indicator cartridge, and the miniaturization of the position indicator can be realized. The position indicator cartridge can be compatible with the refill of a commercially available ballpoint pen.

The position indicator cartridge is housed in the housing of the position indicator. Hence, the configuration of the position indicator can be simple, and the position indicator cartridge can be replaceable. This is convenient.

Incidentally, the position indicator of this type typically includes a switch that is what is generally called a side switch turned on and off by, for example, pressing an operation portion that is exposed from a side circumferential surface of the cylindrical housing to allow the operation portion to be operated. The on/off operation of the side switch is set in association with a predetermined function, such as a function corresponding to a click operation of a mouse pointer, in an electronic apparatus including the position detection device. The user can appropriately turn on or off the side switch in the position indicator to instruct the electronic apparatus to perform the predetermined function.

In the position indicator of an electromagnetic induction type, another capacitor is connected through the side switch to the resonant circuit including the coil wound around the magnetic core and the capacitor as described in, for example, Japanese Patent Laid-Open No. 2018-018149. In this way, the resonant frequency of the resonant circuit is changed, and whether the side switch is on or off is reported to the electronic apparatus side including the position detection device.

As disclosed in Japanese Patent Laid-Open No. 2018-018149, the side switch is turned on and off to control the connection of the other capacitor to the resonant circuit including the coil wound around the magnetic core and the capacitor in the position indicator of an electromagnetic induction type in the related art. In this way, the resonant frequency of the resonant circuit is changed, and whether the side switch is on or off is reported to the position detection device side.

Hence, there is the following problem in providing the side switch in the position indicator in which the position indicator cartridge is housed in the housing.

That is, the resonant circuit is formed on the circuit board in the position indicator cartridge, and in the related art, the side switch needs to be arranged in the position indicator cartridge. On the other hand, the operation portion for turning on and off the side switch needs to be exposed to the outside by provision of the opening on the housing of the position indicator. Hence, an opening for turning on and off the side switch by pushing, into the housing of the position indicator cartridge, an operator of the operation portion exposed to the outside of the housing of the position indicator needs to be provided on the housing of the position indicator cartridge when the method in the related art is used.

However, there is a problem that the strength is reduced if the opening is provided on the housing of the thin position indicator cartridge. There is also a problem that making the position indicator cartridge waterproof becomes difficult if the opening is provided on the housing of the position indicator cartridge.

It is also essential to align the position of the switch in the housing of the position indicator cartridge and the position of the operation portion exposed to the outside of the housing of the position indicator. There leads to a problem that the configuration becomes complicated, and it takes a lot of work to manufacture the position indicator.

BRIEF SUMMARY

An object of the disclosure is to provide a position indicator that can solve the problems.

To solve the problems, provided is a position indicator of an electromagnetic induction type including a position indicator cartridge housed in a hollow portion of a housing, in which the position indicator cartridge includes a first resonant circuit including a first coil wound around a magnetic core arranged on one end of the position indicator cartridge in an axial direction of the position indicator cartridge and a first capacitor, a second coil that is independent of the position indicator cartridge is provided outside the position indicator cartridge, at a position where the second coil, in operation, is magnetically coupled to the first coil of the position indicator cartridge, a switch turned on and off by an operation portion provided outside the position indicator cartridge, wherein the operation portion, in operation, receives an operation made by a user is provided outside the position indicator cartridge, and a closed circuit including the second coil is generated when the switch is turned on.

In the position indicator configured as described above, the position indicator cartridge including the first resonant circuit including the first coil wound around the magnetic core and the capacitor is housed in the hollow portion of the housing. The position indicator is provided with the second coil independent of the position indicator cartridge, the second coil being provided outside of the position indicator cartridge, at a position where the second coil, in operation, is magnetically coupled to the first coil wound around the magnetic core of the position indicator cartridge. The operation portion is arranged on the position indicator in such a manner that the user can operate the operation portion, and the switch turned on and off by the operation of the operation portion is provided. The closed circuit including the second coil is formed when the switch is turned on, and a current can flow through the second coil.

The closed circuit is not formed when the switch is off, and the current does not flow through the second coil. Thus, there is no mutual induction between the first coil and the second coil, and the resonant frequency of the first resonant circuit is a resonant frequency determined by the first coil and the first capacitor.

The closed circuit is formed when the user operates the operation portion to turn on the switch, and mutual induction occurs between the first coil and the second coil. This changes the inductance of the first resonant circuit and changes the resonant frequency. Thus, a position detection device can detect the on/off state of the switch according to the change in frequency of the reception signal from the position indicator.

In the position indicator with the configuration, the switch controls the formation of the closed circuit that can apply a current to the second coil provided independently of the position indicator cartridge, outside of the position indicator cartridge. The switch is not a constituent part of the first resonant circuit of the position indicator cartridge. Hence, the operation portion does not have to be mechanically involved with the position indicator cartridge, and the operation portion can be independent of the position indicator cartridge. It is sufficient if the second coil is provided in such a manner that the second coil is able to be magnetically coupled to the first coil of the position indicator cartridge, and the position indicator cartridge does not have to be changed at all.

Hence, according to the position indicator with the configuration, the side switch can be provided on the position indicator including the position indicator cartridge housed in the housing, even when the position indicator cartridge is replaceable or even when the knock-type mechanism can push the front end portion in and out from the opening of the housing of the position indicator. That is, according to the position indicator with the configuration, the function of the side switch can be provided without the side switch actually being provided on the position indicator cartridge.

BRIEF DESCRIPTION OF THE SEVERAL VIEWS OF THE DRAWINGS

FIGS. 1A and 1B depict a configuration example of an electronic pen as a position indicator according to a first embodiment of the disclosure;

FIG. 3 is a diagram for describing a configuration example of parts of the electronic pen according to the first embodiment of the disclosure;

DETAILED DESCRIPTION

Figure 2A:
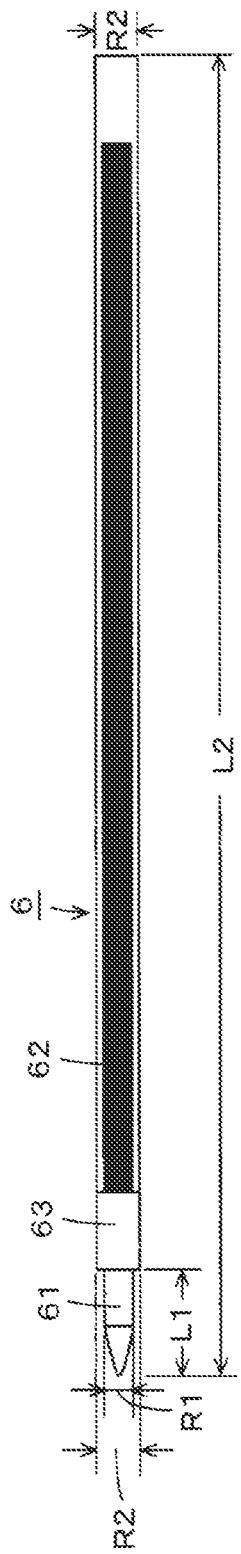
FIGS. 2A and 2B are diagrams for describing a configuration example of an electronic pen body as an example of a position indicator cartridge in the position indicator according to the first embodiment of the disclosure.

Some embodiments of a position indicator according to the disclosure will now be described with reference to the drawings.

First Embodiment

FIGS. 1A and 1B depict a configuration example of the position indicator according to a first embodiment of the disclosure, and the position indicator is an electronic pen of an electromagnetic induction type in the example. In an electronic pen 1 of the first embodiment, an electronic pen body 3 as an example of a position indicator cartridge is housed in a hollow portion 2a of a cylindrical housing 2, and the electronic pen 1 has a knock-type configuration in which a knock-type mechanism 4 pushes a pen tip side of the electronic pen body 3 in and out from an opening 2b side at one end of the housing (electronic pen housing) 2 in a longitudinal direction. In the embodiment, the electronic pen body 3 is replaceable and can be attached to and detached from the housing 2.

A pen tip sleeve 22 is screwed into a housing cylindrical portion 21 as illustrated in FIGS. 1A and 1B, to provide the housing 2 of the electronic pen 1 in the example. The pen tip sleeve 22 has a tapered shape becoming narrower toward a pen tip, and the opening 2b on the pen tip side of the housing 2 is provided on a front end portion of the pen tip sleeve 22.

FIG. 1A illustrates a state in which the entire electronic pen body 3 is placed in the hollow portion 2a of the housing 2, and FIG. 1B illustrates a state in which the knock-type mechanism 4 pushes out the pen tip side of the electronic pen body 3 from the opening 2b of the housing 2. Note that a fracture cross-section of the housing 2 of the electronic pen 1 is illustrated in the example of FIGS. 1A and 1B, and the inside of the housing 2 can be viewed.

The electronic pen 1 of the embodiment is compatible with a commercially available knock-type ballpoint pen. The housing 2 and the knock-type mechanism 4 as an example of the knock-type mechanism provided in the housing 2 have the same configuration as the configuration of a well-known commercially available knock-type ballpoint pen, and the dimensional relation is also the same.

Figure 2B:
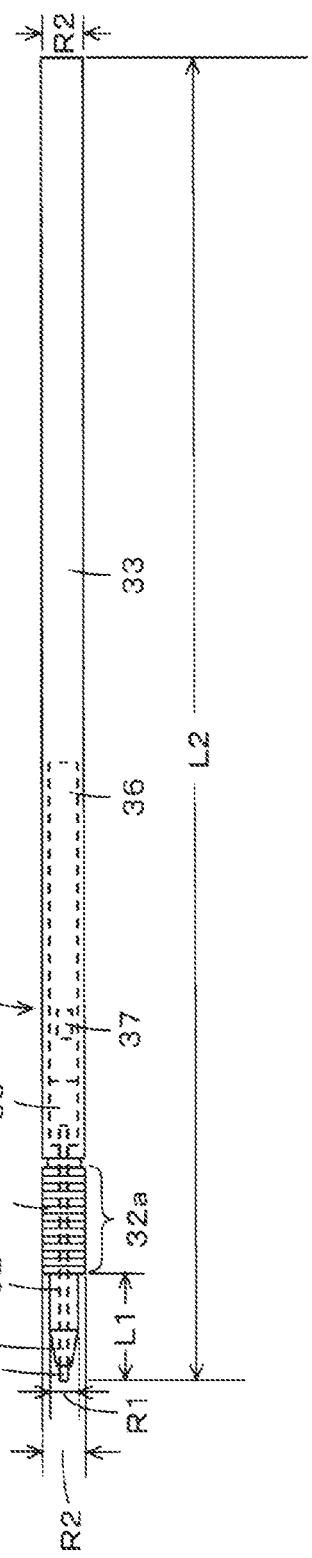

FIGS. 2A and 2B depict a configuration example of the electronic pen body 3 in comparison with a refill of the commercially available knock-type ballpoint pen. Specifically, FIG. 2A illustrates a refill 6 of the commercially available knock-type ballpoint pen, and FIG. 2B illustrates a configuration example of the electronic pen body 3 of the embodiment.

The refill 6 of the commercially available knock-type ballpoint pen has a well-known configuration in which a pen tip portion 61 provided with a ball at a front end and an ink housing portion 62 are coupled and integrated by a coupling portion 63 as illustrated in FIG. 2A. The coupling portion 63 has the same diameter as the ink housing portion 62.

In the electronic pen body 3 of the embodiment, a magnetic core, which is a ferrite core 32 in the example, around which a coil 31 is wound is coupled to a cylindrical body portion 33 as illustrated in FIG. 2B. A core body 34 is inserted through a through hole (not illustrated in FIG. 2B) of the ferrite core 32. The core body 34 is fitted to a pen pressure detector 35 provided in the cylindrical body portion 33 and is provided as part of the electronic pen body 3. As illustrated in FIG. 2B, one end portion 34a (hereinafter, referred to as a front end portion 34a) of the core body 34 protrudes as a pen tip from the ferrite core 32, and another end portion is fitted to the pen pressure detector 35.

The pen pressure detector 35 is a variable capacitor including a pen pressure detection section with a well-known configuration described in, for example, Japanese Patent Laid-Open No. 2011-186803, in which the capacitance changes according to the pen pressure. Note that the pen pressure detector 35 may include a semiconductor element in which the capacitance can vary according to the pen pressure as disclosed in, for example, Japanese Patent Laid-Open No. 2013-161307.

A printed board 36 is further housed in the cylindrical body portion 33. A capacitor 37 connected in parallel to the coil 31 and included in a resonant circuit is provided on the printed board 36. The variable capacitor included in the pen pressure detector 35 is connected in parallel to the capacitor 37 formed on the printed board 36, and the variable capacitor forms part of the resonant circuit (see FIG. 4 described later).

The core body 34 is inserted into the through hole of the ferrite core 32 and fitted to the pen pressure detector 35 in the cylindrical body portion 33. The core body 34 is replaceable.

In the case of the example, the dimension on the pen tip side of the electronic pen body 3 is substantially equal to the dimension on the pen tip side of the refill 6 of the ballpoint pen as illustrated in FIGS. 2A and 2B.

The electronic pen body 3 configured in this way can be housed in the housing 2 by the cylindrical body portion 33 being fitted to the knock-type mechanism 4. A user presses an end portion 42a of a knock rod 42 to use the electronic pen 1 of the embodiment along with a position detection device. Consequently, the front end portion 34a of the core body 34 and part of a non-winding section of the coil of the ferrite core 32 protrude from the opening 2b of the housing 2 in the electronic pen 1 as illustrated in FIG. 1B. In this state, the user of the electronic pen 1 inputs an indicated position on a sensor of the position detection device.

Once the use of the electronic pen 1 is ended, the user can press again the end portion 42a of the knock rod 42 to place the entire electronic pen body 3 in the hollow portion 2a of the housing 2 as illustrated in FIG. 1A. In this case, the entire electronic pen body 3 is placed in the hollow portion 2a of the housing 2, and the front end portion 34a of the core body 34 of the electronic pen body 3 is protected by the housing 2.

A circuit board 8 provided with a side switch 7 is arranged in the hollow portion 2a of the housing 2 of the electronic pen 1 according to the embodiment in such a manner as not to interfere with the movement of the electronic pen body 3 in the axial direction in the hollow portion 2a of the housing 2 as illustrated in FIGS. 1A and 1B.

In the electronic pen 1 of the embodiment, a coil 9 that can be magnetically coupled to and mutually inductively coupled to the coil 31 of the resonant circuit of the electronic pen body 3 is provided, on the pen tip side of the hollow portion 2a of the housing 2, as a member that shifts the resonant frequency of the resonant circuit of the electronic pen body 3 when the side switch 7 is turned on.

FIG. 3 is a partially enlarged view for describing a configuration near the position where the pen tip side of the electronic pen 1 and the side switch 7 are provided, and arrangement positions and configurations of the side switch 7, the circuit board 8, and the coil 9 will further be described with reference also to FIG. 3.

As illustrated in FIGS. 1A, 1B, and 3, a coil holding portion 10 around which the coil 9 is wound is installed inside the pen tip side of the housing cylindrical portion 21 of the housing 2 of the electronic pen 1 according to the embodiment. The coil holding portion 10 includes a cylindrical portion 10a including a through hole that allows insertion of the electronic pen body 3, and the coil 9 is wound around an outer circumference of the cylindrical portion 10a.

As illustrated in FIGS. 1A, 1B, and 3, a flange portion 10b projecting in a ring shape is formed on the opposite side of the pen tip side of the cylindrical portion 10a of the coil holding portion 10, and the flange portion 10b is attached to the inner surface of the housing cylindrical portion 21 of the housing 2 to arrange the coil 9 on the pen tip side of the housing cylindrical portion 21. Part of the cylindrical portion 10a of the coil holding portion 10 protrudes outside with respect to the housing cylindrical portion 21. The pen tip sleeve 22 is screwed into and coupled to the housing cylindrical portion 21 while the cylindrical portion 10a of the coil holding portion 10 is housed in a hollow portion of the pen tip sleeve 22, and in this way, the coil 9 is arranged in the housing 2.

In this case, the knock-type mechanism 4 moves the coil 31 of the pen tip portion of the electronic pen body 3 in the axial direction such that the coil 31 appears and disappears from the opening 2b of the housing 2 through the through hole of the cylindrical portion 10a of the coil holding portion 10 as illustrated in FIGS. 1A, 1B, and 3. The positional relation between the coil 31 of the resonant circuit of the electronic pen body 3 and the coil 9 that allows magnetic coupling is always kept even when the coil 31 is moved.

That is, in the example, at least part of (in the example, most of) the coil 31 is present in the through hole of the cylindrical portion 10a of the coil holding portion 10 in the use state of the electronic pen 1 in which the pen tip portion of the electronic pen body 3 protrudes outside from the opening 2b of the housing 2 as illustrated in FIG. 1B.

As illustrated in FIGS. 1A, 1B, and 3, an opening 2c for an operation portion 11 for pressing the side switch 7 is formed at a position near the center in the axial direction on a side circumferential surface of the housing cylindrical portion 21 of the housing 2. The circuit board 8 is provided at a position covering the range of the presence of the opening 2c on an inner surface of the housing cylindrical portion 21 of the housing 2. As illustrated in FIG. 3, the circuit board 8 is bonded to the inner surface of the housing cylindrical portion 21 of the housing 2 through adhesive members 8a and 8b, such as double-sided tapes, in the example, and the circuit board 8 is arranged in such a manner as not to interfere with the movement of the electronic pen body 3 in the axial direction in the housing cylindrical portion 21. The side switch 7 is arranged on the circuit board 8 in such a manner as to face outside from the opening 2c as illustrated in FIGS. 1A, 1B, and 3. The operation portion 11 includes, for example, an elastic member, such as a rubber member, and the operation portion 11 can elastically be restored after a press operation.

As illustrated in FIG. 3, both end portions 9a and 9b of the coil 9 are extended to the circuit board 8, and the end portions 9a and 9b are, for example, soldered to a conductor pattern of the circuit board 8. In the embodiment, the circuit board 8 is provided with a capacitor 12 connected to the coil 9 to form a resonant circuit. In this case, the resonant circuit is formed as a closed circuit in which the capacitor 12 is connected in parallel to the coil 9 when the side switch 7 is turned on.

Circuit Configuration Example

Figure 4:
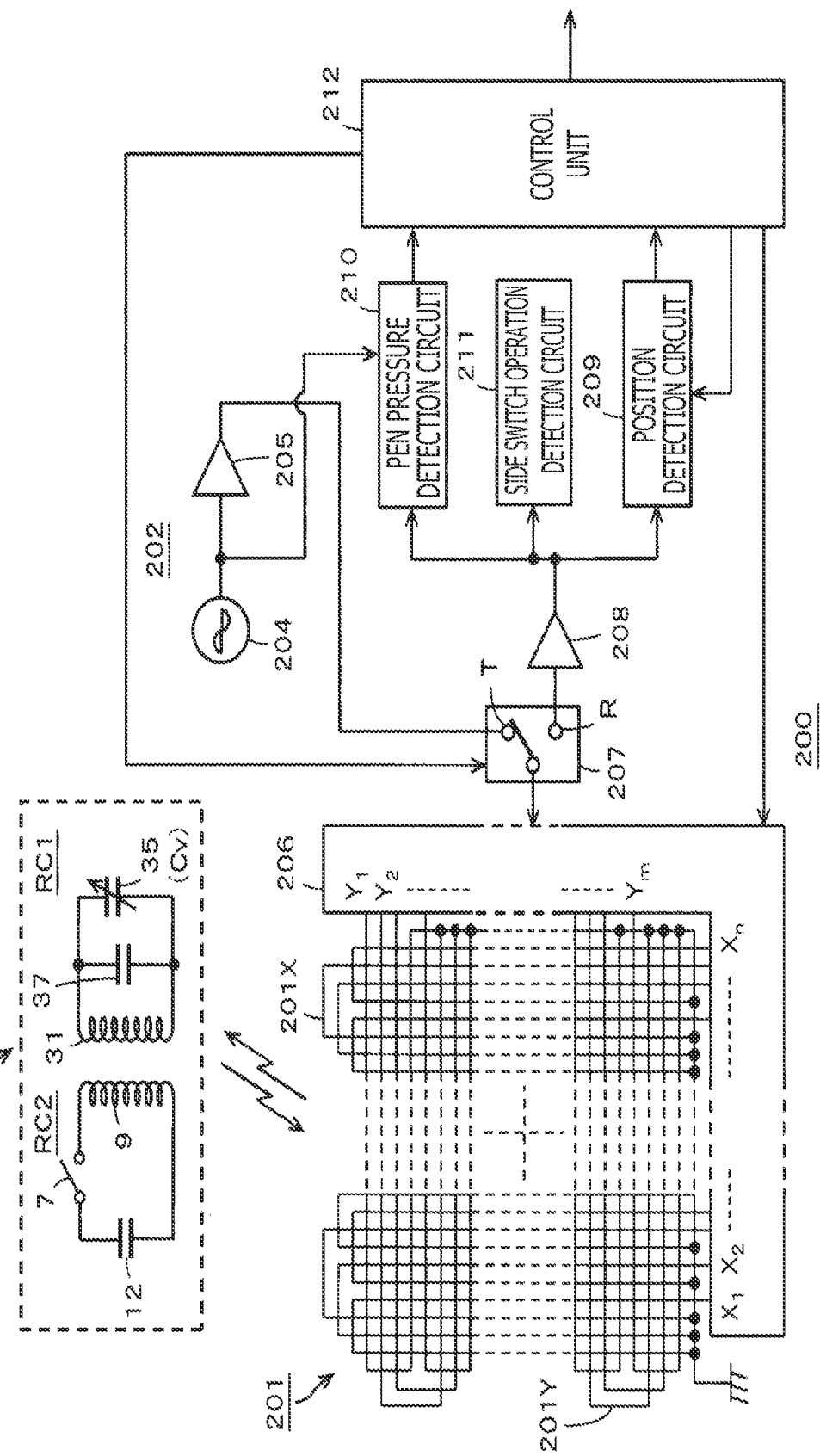
FIG. 4 depicts an electronic circuit example of the electronic pen and a circuit example of a position detection device according to the first embodiment of the disclosure.

FIG. 4 illustrates a circuit configuration example of the electronic pen 1 as a position indicator of the first embodiment and depicts a circuit configuration example of a position detection device 200 that is magnetically inductively coupled to the electronic pen 1 to detect the position.

More specifically, the electronic pen 1 includes circuit components of the electronic pen body 3 including a first resonant circuit RC1 in which the coil 31, the capacitor 37, and a variable capacitor Cv including the pen pressure detector 35 are connected in parallel. In the circuit board 8 of the electronic pen 1, one end of the coil 9 provided on the housing 2 and one end of the capacitor 12 are connected, and the side switch 7 is connected to and between another end of the coil 9 and another end of the capacitor 12. The other end of the coil 9 and the other end of the capacitor 12 are connected to form a closed circuit when the side switch 7 is turned on. The closed circuit is a second resonant circuit RC2 including the coil 9 and the capacitor 12.

In the electronic pen 1, the second resonant circuit RC2 is not formed when the side switch 7 is off, and the closed circuit that applies a current to the coil 9 is not formed. In this case, there is no mutual induction between the coil 31 of the first resonant circuit RC1 of the electronic pen body 3 of the electronic pen 1 and the coil 9 of the second resonant circuit RC2, and the resonant frequency of the first resonant circuit RC1 of the electronic pen body 3 of the electronic pen 1 is a frequency f1 determined by the coil 31, the capacitor 37, and the variable capacitor Cv.

On the other hand, when the user operates the operation portion 11 to turn on the side switch 7 in the electronic pen 1, the second resonant circuit RC2 including the coil 9 and the capacitor 12 is generated, and the closed circuit that applies a current to the coil 9 is formed. Consequently, mutual induction occurs between the coil 31 of the first resonant circuit RC1 of the electronic pen body 3 of the electronic pen 1 and the coil 9 of the second resonant circuit RC2. Hence, the resonant frequency of the resonant circuit RC1 of the electronic pen body 3 of the electronic pen 1 is a frequency f2 different from the frequency f1.

The position detection device 200 includes a position detection sensor 201 and a position detection circuit 202. An X-axis direction loop coil group 201X and a Y-axis direction loop coil group 201Y are layered to form the position detection sensor 201.

The position detection circuit 202 includes an oscillator 204, a current driver 205, a selection circuit 206, a switch connection circuit 207, a reception amplifier 208, a position detection circuit 209, a pen pressure detection circuit 210, a side switch operation detection circuit 211, and a control unit 212. The control unit 212 includes a microprocessor. The control unit 212 controls selection of loop coils in the selection circuit 206 and switching of the switch connection circuit 207 and also controls process timing in the position detection circuit 209 and the pen pressure detection circuit 210.

The X-axis direction loop coil group 201X and the Y-axis direction loop coil group 201Y of the position detection sensor 201 are connected to the selection circuit 206. The selection circuit 206 sequentially selects each loop coil of the two loop coil groups 201X and 201Y. The oscillator 204 generates an alternating current (AC) signal with a frequency f0. The oscillator 204 supplies the generated AC signal to the current driver 205 and the pen pressure detection circuit 210. The current driver 205 converts the AC signal supplied from the oscillator 204 into an electric current and sends the electric current to the switch connection circuit 207.

The switch connection circuit 207 switches connection points (transmission side terminal T and reception side terminal R) of the loop coils selected by the selection circuit 206, under the control of the control unit 212. The current driver 205 is connected to the transmission side terminal T of the connection points, and the reception amplifier 208 is connected to the reception side terminal R of the connection points. The switch connection circuit 207 is switched to the terminal T side when a signal is to be transmitted from the position detection sensor 201, and the switch connection circuit 207 is switched to the terminal R side when the position detection sensor 201 receives a signal from outside.

The current from the current driver 205 is supplied to the loop coil selected by the selection circuit 206, when the switch connection circuit 207 is switched to the terminal T side. As a result, a magnetic field is generated in the selected loop coil, and a signal (radio wave) to act on the opposing first resonant circuit RC1 of the electronic pen body 3 of the electronic pen 1 can be transmitted.

On the other hand, when the switch connection circuit 207 is switched to the terminal R side, the induced voltage generated in the loop coil selected by the selection circuit 206 is transmitted to the reception amplifier 208 through the selection circuit 206 and the switch connection circuit 207. The reception amplifier 208 amplifies the induced voltage supplied from the loop coil and sends the voltage to the position detection circuit 209, the pen pressure detection circuit 210, and the side switch operation detection circuit 211.

That is, the radio wave transmitted (fed back) from the first resonant circuit RC1 of the electronic pen body 3 of the electronic pen 1 generates an induced voltage in each loop coil of the X-axis direction loop coil group 201X and the Y-axis direction loop coil group 201Y.

The position detection circuit 209 detects the induced voltage, that is, the reception signal, generated in the loop coil in relation to the components of the resonant frequency of the first resonant circuit RC1 of the electronic pen body 3 of the electronic pen 1. The position detection circuit 209 converts the detection output signal into a digital signal and outputs the digital signal to the control unit 212.

The control unit 212 calculates coordinate values of the indicated position in the X-axis direction and the Y-axis direction of the front end portion 34a of the electronic pen body 3 of the electronic pen 1 according to the digital signal related to the resonant frequency components from the position detection circuit 209, that is, according to each level of the voltage value of the induced voltage generated in each loop coil.

The pen pressure detection circuit 210 uses the AC signal from the oscillator 204 to synchronously detect the reception signal from the reception amplifier 208 and detects the pen pressure applied to the front end portion 34a of the electronic pen body 3 of the electronic pen 1, according to the frequency shift (phase shift) between the signals.

The side switch operation detection circuit 211 detects the resonant frequency of the first resonant circuit RC1 of the electronic pen body 3 of the electronic pen 1 according to the frequency of the output signal from the reception amplifier 208 and determines whether the detected frequency is a resonant frequency at the time that the side switch 7 is off or a resonant frequency at the time that the side switch 7 is on. The side switch operation detection circuit 211 outputs the detection result to the control unit 212. The control unit 212 determines whether or not the side switch 7 is turned on, according to the output of the side switch operation detection circuit 211.

The control unit 212 transmits information regarding the coordinate values of the detected position indicated by the electronic pen 1, the pen pressure value, and the detection result of on/off of the side switch 7 to an information processing unit (host computer) included in an electronic apparatus provided with the position detection device.

As described above, the second coil 9 is provided separately from the electronic pen body 3 in the electronic pen 1 of the first embodiment, at the position where the second coil 9 is magnetically coupled to the coil 31 of the first resonant circuit RC1 of the electronic pen body 3. The closed circuit including the second resonant circuit RC2 including the second coil 9 and the second capacitor 12 is turned on and off according to on/off of the side switch 7 provided on the housing 2 of the electronic pen 1. Hence, according to the electronic pen 1 of the first embodiment, the resonant circuit (first resonant circuit) of the electronic pen body 3 does not have to be a resonant circuit including two types of resonant frequencies, or a side switch does not have to be provided on the electronic pen body 3. The electronic pen body 3 can be used as it is without a process of providing an opening being applied.

Thus, the electronic pen 1 of the first embodiment can have a function of a side switch with a relatively simple configuration even when the knock-type mechanism 4 moves the electronic pen body 3 in the axial direction.

Second Embodiment

Although, in the electronic pen 1 as an example of the position indicator according to the first embodiment, the second coil that changes, when the side switch is turned on, the resonant frequency of the first resonant circuit of the electronic pen body as an example of the position indicator cartridge is provided inside the housing 2 of the electronic pen 1, the second coil may also be provided outside the housing 2 of the electronic pen 1.

The position indicator of a second embodiment is an electronic pen as in the first embodiment. The electronic pen body 3 as an example of the position indicator cartridge is housed in the hollow portion of the housing in the state in which the knock-type mechanism 4 can push the electronic pen body 3 in and out from the opening at the front end of the housing. The second coil is provided outside the housing of the electronic pen.

Figure 5:
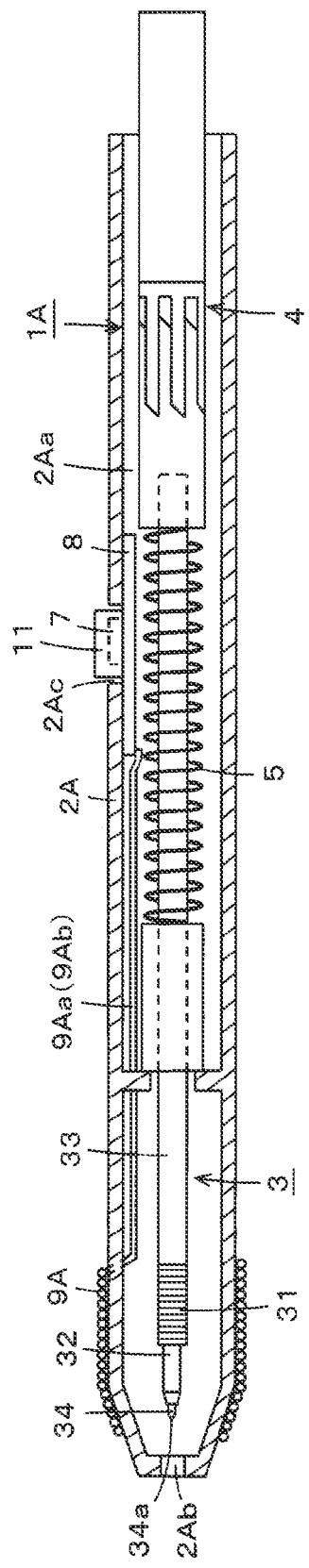
FIG. 5 depicts a configuration example of an electronic pen as a position indicator according to a second embodiment of the disclosure.

FIG. 5 depicts a configuration example of an electronic pen 1A as an example of the position indicator according to the second embodiment, and FIG. 5 corresponds to FIG. 1A of the electronic pen 1 according to the first embodiment. In the electronic pen 1A of the second embodiment illustrated in FIG. 5, the same reference signs are provided to parts similar to the parts of the electronic pen 1 of the first embodiment, and the details will not be described.

A housing 2A of the electronic pen 1A according to the second embodiment is not separated into the housing cylindrical portion 21 and the pen tip sleeve 22 in the example, and the housing 2A is a single cylindrical member. The housing 2A includes an opening 2Ab on the pen tip side and an opening 2Ac on the back end side. In the housing 2A of the electronic pen 1A according to the second embodiment, the electronic pen body 3 is housed in a hollow portion 2Aa of the housing 2A, and the knock-type mechanism 4 can push the front end portion 34a side of the core body 34 of the electronic pen body 3 in and out from the opening 2Ab.

In the electronic pen 1A of the second embodiment, a coil 9A is provided on an outer circumference part on the pen tip side of the housing 2A, at a position where the coil 9A can be magnetically coupled to the coil 31 wound around the ferrite core 32 of the front end portion of the electronic pen body 3, as illustrated in FIG. 5.

The opening 2Ac for the operation portion 11 for pressing the side switch 7 is formed at a position near the center in the axial direction on a side circumferential surface of the housing 2A. The circuit board 8 is arranged at a position covering the range of the presence of the opening 2Ac on an inner surface of the housing 2A, and an adhesive member (not illustrated), such as a double-sided tape, is used to bond the circuit board 8 in such a manner that the circuit board 8 does not interfere with the movement of the electronic pen body 3 in the axial direction in the housing cylindrical portion 21. The side switch 7 is arranged on the circuit board 8 in such a manner as to face outside from the opening 2Ac as illustrated in FIG. 5.

Both ends 9Aa and 9Ab of the coil 9A are introduced into the hollow portion 2Aa of the housing 2A through a through hole not illustrated. As in the coil 9 of the first embodiment, the ends 9Aa and 9Ab are connected to the capacitor 12 (not illustrated in FIG. 5) through the side switch 7 of the circuit board 8, and a resonant circuit including the coil 9A and the capacitor 12 is formed when the side switch 7 is turned on.

The electronic pen 1A of the second embodiment can operate in exactly the same way as the electronic pen 1 of the first embodiment, except that the coil 9A magnetically coupled to the coil 31 of the resonant circuit of the electronic pen body 3 is provided outside the housing 2A of the electronic pen 1A, and similar effects can be obtained.

Although the housing 2A of the electronic pen 1A of the second embodiment includes one cylindrical body in the example, the housing 2A may be divided into two parts on the back end side of the section provided with the opening 2Ac for the operation portion 11 for pressing the side switch 7 of the housing 2A, and the parts may be coupled by, for example, screwing or press fitting. The electronic pen body 3 can easily be replaced when the housing 2A is divided into two parts to allow the housing 2A to be separated in this way.

Third Embodiment

A position indicator according to a third embodiment of the disclosure is a modification of the electronic pen 1 of the first embodiment. In the electronic pen 1 of the first embodiment, only one electronic pen body 3 is housed in the housing 2. In the third embodiment, a plurality of electronic pen bodies are housed in the housing, and the knock-type mechanism selects one of the plurality of electronic pen bodies and causes the front end of the pen tip portion of the selected electronic pen body to protrude from the opening on the pen tip side of the housing to allow use of the front end.

As described above, the electronic pen body 3 of the electronic pen 1 of the first embodiment is compatible with the refill 6 of the ballpoint pen. An example of the commercially available ballpoint pen includes a multi-color ballpoint pen provided with refills of different ink colors. The third embodiment provides an electronic pen including the electronic pen body 3 housed in a housing with a configuration similar to the configuration of the housing of the multi-color ballpoint pen.

Figure 6A:
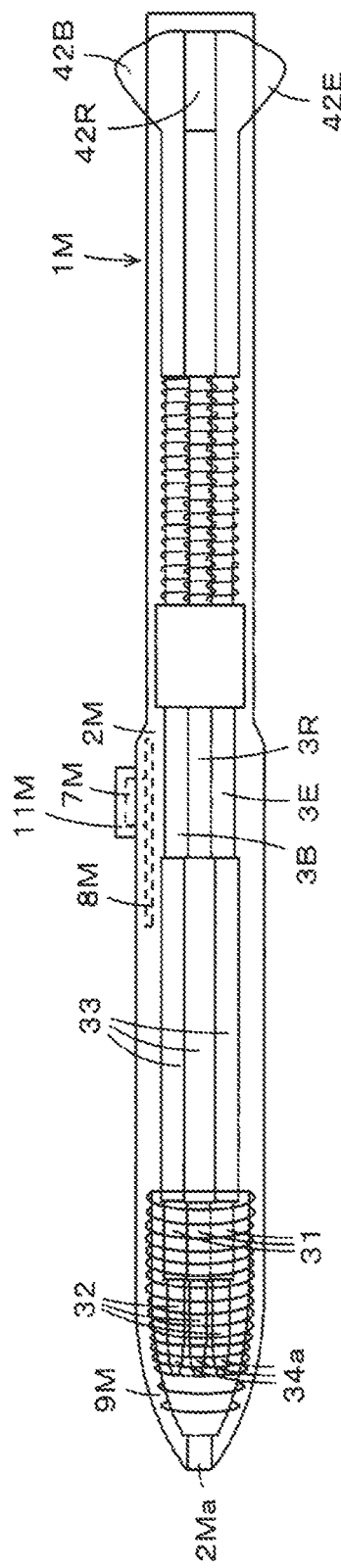
FIGS. 6A and 6B depict a configuration example of an electronic pen as a position indicator according to a third embodiment of the disclosure.

FIG. 6A is a configuration diagram illustrating an appearance of an electronic pen 1M according to the third embodiment. A housing 2M of the electronic pen 1M has a configuration similar to the configuration of the housing and the knock-type mechanism of the commercially available knock-type multi-color ballpoint pen. Three electronic pen bodies 3B, 3R, and 3E are housed in the housing 2M in the example.

The configuration of the electronic pen bodies 3B, 3R, and 3E is similar to the configuration of the electronic pen body 3 of the first embodiment except that the electronic pen bodies 3B, 3R, and 3E have the same dimension as the dimension of the refills of the multi-color ballpoint pen. The coil 31 wound around the ferrite core 32 is provided on the front end side of each of the electronic pen bodies 3B, 3R, and 3E, and the cylindrical body portion 33 includes the capacitor 37 included in the resonant circuit together with the coil 31 and includes the pen pressure detector 35.

In each of the electronic pen bodies 3B, 3R, and 3E of the third embodiment, a control unit and peripheral circuits of the control unit for realizing a function of transmitting identification information (hereinafter, referred to as ID information) of the electronic pen body to the position detection device are provided on the cylindrical body portion 33 provided with electronic circuit parts. An electronic circuit example of the electronic pen bodies 3B, 3R, and 3E will be described later.

The knock-type mechanism of the electronic pen 1M includes knock rods 42B, 42R, and 42E fitted to the electronic pen bodies 3B, 3R, and 3E, respectively. One of the knock rods 42B, 42R, and 42E is slid to the pen tip side, and the front end portion 34a of the core body 34 and part of the ferrite core 32 of one of the electronic pen bodies 3B, 3R, and 3E protrude and are magnetically inductively coupled to the sensor of the position detection device.

In the case of the embodiment, the position detection device used along with the electronic pen bodies 3B, 3R, and 3E has a function of receiving and identifying the ID information transmitted from each of the electronic pen bodies 3B, 3R, and 3E. That is, the position detection device of the embodiment identifies the difference between the electronic pen bodies 3B, 3R, and 3E in reference to the ID information to realize the function allocated to each of the electronic pen bodies 3B, 3R, and 3E.

In the example described below, a function of indicating a black trajectory (character or figure) displayed according to the indicated position of the electronic pen body 3B is allocated to the electronic pen body 3B. A function of indicating a red trajectory displayed according to the indicated position of the electronic pen body 3R is allocated to the electronic pen body 3R. A function of erasing an input trajectory according to the indicated position of the electronic pen body 3E is allocated to the electronic pen body 3E, for example. The function allocated to the electronic pen body is not limited to the display color of the trajectory corresponding to the indicated position as in the example, and there can be various functions. For example, the function may indicate the thickness of the trajectory or the type of displayed line, such as a solid line, a dotted line, and a chain line.

Figure 6B:
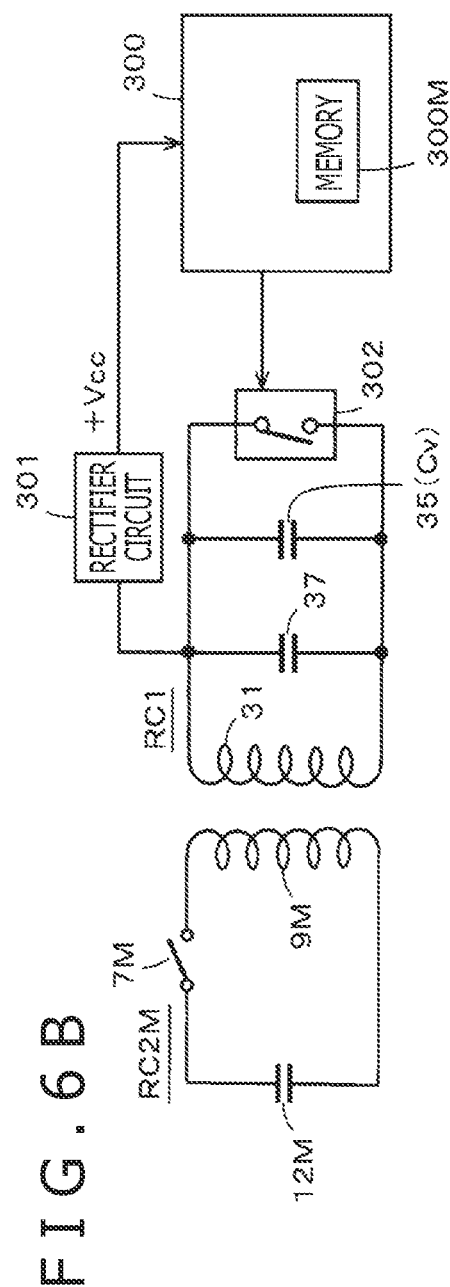

FIG. 6B illustrates an electronic circuit configuration example of one of the electronic pen bodies 3B, 3R, and 3E, i.e., the electronic pen body 3B here. It is obvious that the other electronic pen bodies 3R and 3E have the same circuit configuration and operate in the same way.

As illustrated in FIG. 6B, the electronic pen body 3B includes the first resonant circuit RC1 in which the capacitor 37 provided on the cylindrical body portion 33 and the variable capacitor Cv of the pen pressure detector 35 are connected in parallel to the coil 31 as in the electronic pen body 3 of the first embodiment. The electronic pen body 3B includes a control unit 300 including, for example, an integrated circuit (IC); a rectifier circuit 301; and a switch circuit 302.

The rectifier circuit 301 rectifies an AC signal received by the first resonant circuit RC1 from the position detection device through magnetic inductive coupling, to generate a power supply voltage Vcc and supplies the power supply voltage Vcc to the control unit 300.

The switch circuit 302 is connected in parallel to the coil 31 of the first resonant circuit RC1, and the control unit 300 controls on/off of the switch circuit 302.

The control unit 300 stores, in a built-in memory 300M, ID information including, for example, a digital signal of 8 bits including such information as a manufacturer number of the electronic pen body 3B, a product number, and the type of function, in the example. The control unit 300 controls on/off of the switch circuit 302 by, for example, turning off the switch circuit 302 when the value of each bit of the ID information stored in the memory 300M is "0" and turning on the switch circuit 302 when the value is "1." In this way, the control unit 300 intermittently shifts the AC signal received from the position detection device to generate an Amplitude Shift Keying (ASK) signal and transmits the ID information to the position detection device.

In the electronic pen 1M of the third embodiment, a second coil 9M containing all front end portions of the three electronic pen bodies 3B, 3R, and 3E and covering the surroundings of the front end portions is provided on the pen tip side of the hollow portion of the housing 2M as illustrated in FIG. 6A. That is, one second coil 9M in common for the three electronic pen bodies 3B, 3R, and 3E is provided on the pen tip side of the hollow portion of the housing 2M in such a manner that the second coil 9M is magnetically coupled to the coil 31 of each of the electronic pen bodies 3B, 3R, and 3E in the example of FIG. 6A.

An opening (not illustrated in FIGS. 6A and 6B) is formed at a position near the center in the axial direction on a side circumferential surface of the housing 2M. A circuit board 8M is arranged at a position covering the range of the presence of the opening on an inner surface of the housing 2M, and the circuit board 8M is bonded to the inner surface of the housing 2M through an adhesive member, such as a double-sided tape, in such a manner as not to interfere with the movement of the three electronic pen bodies 3B, 3R, and 3E in the axial direction in the housing 2M of the electronic pen 1M. A side switch 7M is provided on the circuit board 8M in such a manner as to face outside from the opening of the side circumferential surface of the housing 2M. An operation portion 11M for pressing the side switch 7M is arranged to protrude outside from the opening of the side circumferential surface of the housing 2M.

The circuit board 8M is provided with a capacitor 12M (not illustrated in FIG. 6A) connected to form a second resonant circuit RC2M with the coil 9M when the side switch 7M is turned on, as illustrated in FIG. 6B.

The position detection device magnetically inductively coupled to the electronic pen 1M of the third embodiment has the functions of the position detection circuit 209, the pen pressure detection circuit 210, and the side switch operation detection circuit 211 similarly to the position detection device 200 corresponding to the electronic pen 1 of the first embodiment and further has a function of detecting the ID information from each of the electronic pen bodies 3B, 3R, and 3E of the electronic pen 1M.

In the third embodiment, the function corresponding to the operation of the side switch 7M can be set for each of the three electronic pen bodies 3B, 3R, and 3E of the electronic pen 1M in the position detection device, and each function is stored in association with the ID information. Hence, the function of the side switch in the position detection device can be the same for all of the three electronic pen bodies 3B, 3R, and 3E of the electronic pen 1M, or different individual functions can be allocated and set for the three electronic pen bodies 3B, 3R, and 3E.

In the electronic pen 1M of the third embodiment, one of the knock rods 42B, 42R, and 42E of the knock-type mechanism can be knocked (slid) in the axial direction to cause the pen tip portion of one of the electronic pen bodies 3B, 3R, and 3E fitted to the knocked knock rod to protrude from an opening 2Ma of the housing 2M and allow the pen tip portion to be electromagnetically coupled to the position detection device. In the following description, the electronic pen body including the pen tip portion that protrudes from the opening 2Ma of the housing 2M and that can be electromagnetically coupled to the position detection device will be referred to as a selected electronic pen body.

The position detection device in the third embodiment detects the position indicated by the pen tip portion through the magnetic inductive coupling of the first resonant circuit RC1 of the selected electronic pen body including the pen tip portion protruding from the opening 2Ma and the position detection sensor and detects the pen pressure value applied to the pen tip portion. The position detection device uses the ID information included in the signal from the selected electronic pen body to identify whether the selected electronic pen body is the electronic pen body 3B, 3R, or 3E.

When the user operates the operation portion 11M in the electronic pen 1M, the side switch 7M is turned on as illustrated in FIG. 6B, and the second resonant circuit RC2M is generated as a closed circuit. This changes the resonant frequency of the first resonant circuit RC1 of the selected electronic pen body, and the position detection device detects the frequency change to detect that the side switch 7M is turned on. The position detection device determines the function corresponding to the side switch 7M set and stored in association with the ID information corresponding to the selected electronic pen body and transmits the information of the corresponding function to the host computer through, for example, a wireless communication unit.

As described above, the knock-type mechanism causes one of the pen tip portions of the three electronic pen bodies 3B, 3R, and 3E to protrude from the opening 2Ma of the housing 2M to allow the electronic pen 1M of the third embodiment to be used, and the function of the side switch of each of the three electronic pen bodies 3B, 3R, and 3E can be realized without the electronic pen bodies 3B, 3R, and 3E being revised.

In this case, the side switch, the operation portion, and the coil may be provided, for each of the three electronic pen bodies 3B, and 3R, and 3E, on the housing 2M as members for realizing the function of the side switch. However, one side switch 7M, the operation portion 11M, and one coil 9M shared by the three electronic pen bodies 3B, 3R, and 3E are provided in the third embodiment, so that the configuration can be simpler than that in the case in which the side switch, the operation portion, and the coil are provided for each of the three electronic pen bodies 3B, 3R, and 3E.

In the electronic pen 1M of the third embodiment, the three electronic pen bodies 3B, 3R, and 3E have functions of transmitting the ID information for identifying them. Therefore, a different corresponding function as a function corresponding to the side switch 7M can be set for each of the three electronic pen bodies 3B, 3R, and 3E, and this is convenient.

Note that the method of identifying each of the electronic pen bodies 3B, 3R, and 3E executed by the position detection device is not limited to the method of using the ID information as in the third embodiment. For example, the resonant frequencies of the first resonant circuits RC1 of the electronic pen bodies 3B, 3R, and 3E may be frequencies different from each other, and the position detection device may detect the difference in frequency received from the electronic pen bodies 3B, 3R, and 3E to identify each of the electronic pen bodies 3B, 3R, and 3E.

Although the number of electronic pen bodies that can be housed in one housing is three in the description of the third embodiment, the number of electronic pen bodies may be two or four or more.

Although the housing 2M of the electronic pen 1M of the third embodiment includes one cylindrical body, the housing 2M may be separated into a pen tip sleeve and a cylindrical body housing as in the electronic pen 1 of the first embodiment, and the pen tip sleeve and the cylindrical body housing may be coupled by, for example, screwing or press fitting. When the housing 2M is divided into two parts to allow separation of the housing 2M in this way, each of the electronic pen bodies 3B, 3R, and 3E can easily be replaced.

Although the second coil 9M included in the second resonant circuit RC2M is provided in the hollow portion of the housing 2M in the third embodiment, the second coil 9M may be provided on the outer circumference part on the pen tip side of the housing 2M as in the electronic pen 1A of the second embodiment.

In that case, the housing 2M may be divided into two parts at a position on the back end side of the section provided with the opening for the operation portion 11M for pressing the side switch 7M, and the parts may be coupled by, for example, screwing or press fitting.

Fourth Embodiment

Although the position indicator is an electronic pen in the first to third embodiments, the position indicator of the disclosure can also be applied to an electronic eraser of an electromagnetic induction type. The electronic eraser of an electromagnetic induction type indicates a position indicated by the electronic pen of an electromagnetic induction type, to erase writing data (coordinate data) input and indicated by the electronic pen.

Figure 7A:
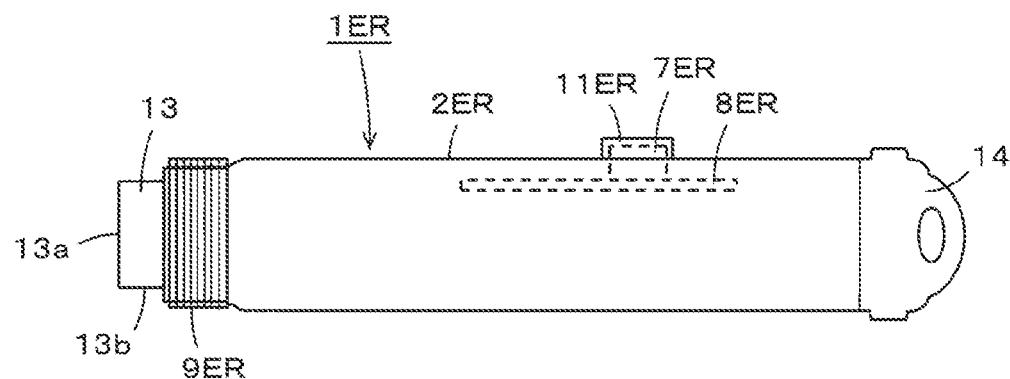
FIGS. 7A to 7C depict a configuration example of an electronic eraser as a position indicator according to a fourth embodiment of the disclosure.
Figure 7B:
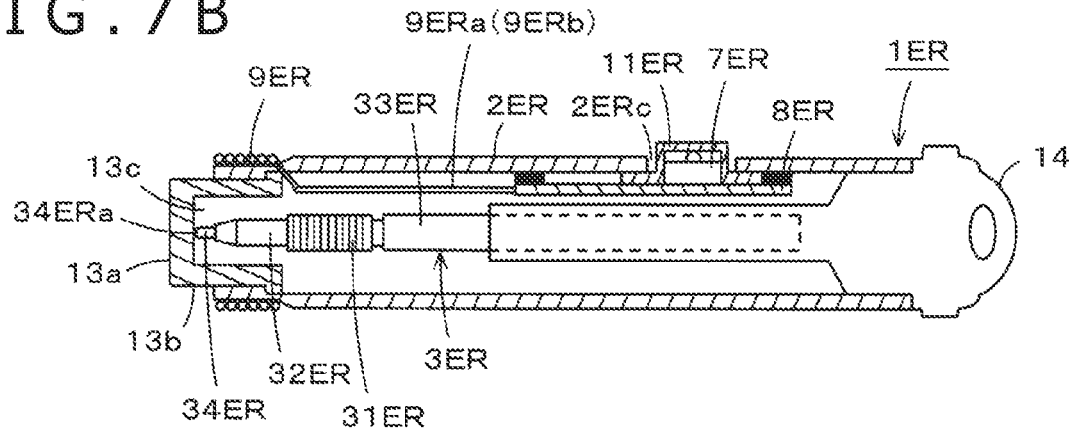
Figure 7C:
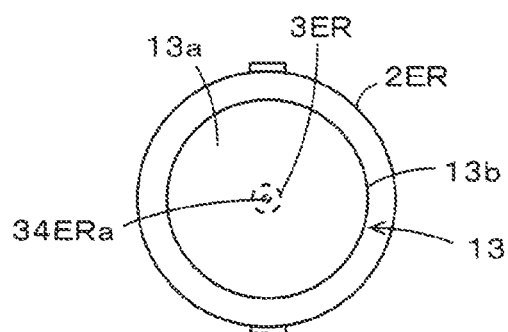

FIGS. 7A to 7C are diagrams for describing an electronic eraser 1ER as the position indicator according to a fourth embodiment of the disclosure. As illustrated in an external view of FIG. 7A, the electronic eraser 1ER includes an erasing portion 13 on one end portion (front end) in the axial direction of a housing 2ER in a cylindrical shape, and an eraser body 3ER as an example of a position indicator cartridge is housed in a hollow portion of the housing 2ER. In the example, the eraser body 3ER is fitted and fixed to a holding portion 14 installed on another end portion (back end) of the housing 2ER.

The erasing portion 13 includes a circular front end surface 13a and a side circumferential surface 13b extending in a cylindrical shape from an outer circumference (outer edge) of the front end surface 13a.

The eraser body 3ER in the example has a configuration similar to the configuration of the electronic pen body 3 of the electronic pen 1 according to the first embodiment, and a suffix "ER" is added to the same reference number to indicate a part similar to the part of the electronic pen body 3. That is, the eraser body 3ER is provided with a ferrite core 32ER on the pen tip side around which a coil 31ER is wound, and a core body 34ER is fitted to a pressure detector (not illustrated) in the cylindrical body portion 33ER through a through hole of the ferrite core 32ER. The pressure detector has a configuration similar to the configuration of the pen pressure detector 35 of the electronic pen body 3.

FIG. 7B is a diagram in which the housing 2ER and the erasing portion 13 of the electronic eraser 1ER are cut in half along the axial direction and the front side part is removed. The erasing portion 13 has a cup shape including a recessed portion 13c and has a shape in which an end portion on the opening side of the recessed portion 13c projects outside. When the erasing portion 13 and the holding portion 14 provided with the eraser body 3ER are attached to the housing 2ER, a front end portion 34ERa of the core body 34ER of the eraser body 3ER comes into slight contact with the bottom surface of the inner surface of the recessed portion 13c of the erasing portion 13.

In this case, a part with a predetermined thickness exists between (a) the front end surface 13a and the side circumferential surface 13b of the erasing portion 13 and (b) the inner surface of the recessed portion 13c as illustrated in FIG. 7B. Hence, when the electronic eraser 1ER is not used, the front end portion 34ERa of the core body 34ER of the eraser body 3ER is held at a position separated by a predetermined distance from the front end surface 13a and the side circumferential surface 13b of the erasing portion 13.

In the electronic eraser 1ER of the embodiment, the erasing portion 13 can slide toward inside the housing 2ER (can move in the axial direction) when the erasing portion 13 is pressed from outside. Hence, the pressure applied to the erasing portion 13 is transmitted to the core body 34ER of the eraser body 3ER, and the pressure detector mounted on the eraser body 3ER can detect the pressure applied to the erasing portion 13. Once the pressure applied to the erasing portion 13 is cancelled, the eraser body 3ER pushes back the erasing portion 13, and the erasing portion 13 returns to the original position.

When the handwriting information input by the electronic pen is displayed as image information on the display screen of the electronic apparatus, the electronic eraser 1ER of the embodiment indicates the position according to the position on the operation surface corresponding to the part of the image information to be erased, to thereby erase the handwriting information (coordinate information) of the indicated part.

In this case, the electronic eraser 1ER can be tilted, and a corner formed by the front end surface 13a and the side circumferential surface 13b, that is, an outer edge part of the front end surface 13a, can be set as a part in contact with the operation surface to give an instruction for erasure in the electronic eraser 1ER of the embodiment.

In this case, the position detection device can transmit, to the information processing unit (host computer) of the electronic apparatus, information regarding the position and the range of the part of the corner of the electronic eraser 1ER in contact with the operation surface, and the host computer can use, for example, a circular mark to display the erasing range around the position of the contact part on the display screen of the image information of the writing information. In this way, the user can recognize the erasing indication position and the range when the user uses the corner formed by the front end surface 13a and the side circumferential surface 13b of the electronic eraser 1ER to give an instruction for erasure, and this is convenient. Note that the erasing range around the contact part can have a size corresponding to the pressure detected by the pressure detector provided on the eraser body 3ER.

As illustrated in FIGS. 7A and 7B, a coil 9ER magnetically coupled to the coil 31ER of the eraser body 3ER is wound around an outer circumference of the end portion on the erasing portion 13 side of the housing 2ER of the electronic eraser 1ER according to the fourth embodiment configured as described above. Note that the coil 9ER is provided inside the housing 2ER such that the coil 9ER is magnetically coupled to the coil 31ER of the eraser body 3ER.

An opening 2ERc is formed at a position near the center in the axial direction on a side circumferential surface of the housing 2ER of the electronic eraser 1ER, and an operation portion 11ER for pressing a side switch 7ER from the opening 2ERc is provided. A circuit board 8ER is arranged at a position covering the range of the presence of the opening 2ERc on the inner surface of the housing 2ER, and the circuit board 8ER is bonded by an adhesive member (not illustrated), such as a double-sided tape, in such a manner as not to come into contact with the eraser body 3ER. As illustrated in FIGS. 7A and 7B, the side switch 7ER faces outside from the opening 2ERc, and the side switch 7ER can be pressed with the operation portion 11ER. The side switch 7ER is arranged on the circuit board 8ER in this state.

Both ends 9ERa and 9ERb of the coil 9ER are introduced into the hollow portion 2ERa of the housing 2ER through a through hole not illustrated, and the ends 9ERa and 9ERb are connected to a capacitor 12ER (not illustrated in FIGS. 7A to 7C) through the side switch 7ER of the circuit board 8ER as in the coil 9 of the first embodiment. The second resonant circuit is formed when the side switch 7ER is turned on.

Accordingly, when the operation portion 11ER is pressed to turn on the side switch 7ER, the second resonant circuit including the coil 9ER and the capacitor 12ER is generated to form a closed circuit in which the current flows through the coil 9ER. This causes mutual induction between the coil 31ER of the first resonant circuit of the eraser body 3ER and the coil 9ER of the second resonant circuit. Hence, the resonant frequency of the first resonant circuit of the eraser body 3ER is a frequency different from the frequency at the time when the side switch 7ER is off.

As in the description of the embodiments, the position detection device detects the resonant frequency of the first resonant circuit of the eraser body 3ER of the electronic eraser 1ER and determines whether the detected frequency is a resonant frequency at the time when the side switch 7ER is off or a resonant frequency at the time when the side switch 7ER is on. The position detection device transmits the detection result to the host computer. The host computer executes the function allocated to the side switch 7ER.

There can be various functions associated with the operation of the side switch 7ER of the electronic eraser 1ER, and the functions may be, for example, as follows.

As described above, the pressure detector of the eraser body 3ER can detect the pressure (pressing force) applied to the erasing portion 13 in the electronic eraser 1ER, and the detection result can be transmitted after including the detection result in the position indication signal to be sent out as a magnetic field. Hence, the pressure applied to the erasing portion 13 can also be detected along with the indicated position on the electronic apparatus side including the position detection device, and the erasing range can be expanded and reduced around the center position of the erasing indication position (corresponding to the contact part of the corner of the electronic eraser 1ER) according to the detected pressure.

Accordingly, when the side switch 7ER is off in the electronic eraser 1ER of the example, the erasing range is a narrow range with a constant radius around the contact part of the corner of the electronic eraser 1ER, and the pressure detected by the pressure detector is not reflected on the erasing range. On the other hand, when the side switch 7ER is turned on, the pressure detected by the pressure detector is reflected on the erasing range. Note that in this case, the erasing range of the electronic eraser 1ER may be displayed with a circle around the position of a contact point P to notify the user of the erasing range on the display screen of the electronic apparatus. In this case, the radius of the circle indicating the erasing range is constant when the side switch 7ER is off, and the radius of the circle indicating the erasing range is a value corresponding to the detected pressure when the side switch 7ER is on.

Other Embodiments

Example of Multiple Side Switches

The position indicator of the embodiments includes one side switch, and one function is allocated thereto. However, two or more side switches may be provided, and individual functions may be allocated to the plurality of side switches. Examples of configurations for changing the resonant frequency of the first resonant circuit of the electronic pen body as an example of the position indicator cartridge or the eraser body in this case include various configurations as described below. An example of a case of two side switches will be described below.

As for the configuration of operation portions for pressing the two side switches, the two side switches are provided on the circuit board, and independent operation portions are used to press the two side switches. In this case, the two side switches are arranged on the circuit board at different positions in the longitudinal direction (axial direction) that is the axial direction of the housing of the position indicator that houses the position indicator cartridge. Alternatively, in the hollow portion of the housing of the position indicator, two circuit boards with the axial direction of the housing as the longitudinal direction may be provided without overlapping with each other, at angular range positions in the inner circumferential direction of the housing not overlapping with each other. The side switch may be provided on each of the two circuit boards, and the operation portion may be provided at the corresponding position.

Instead of separately providing the operation portion for each of the two side switches as described above, one seesaw operation portion capable of seesaw movement may be used to turn on and off the two side switches.

Figure 8:
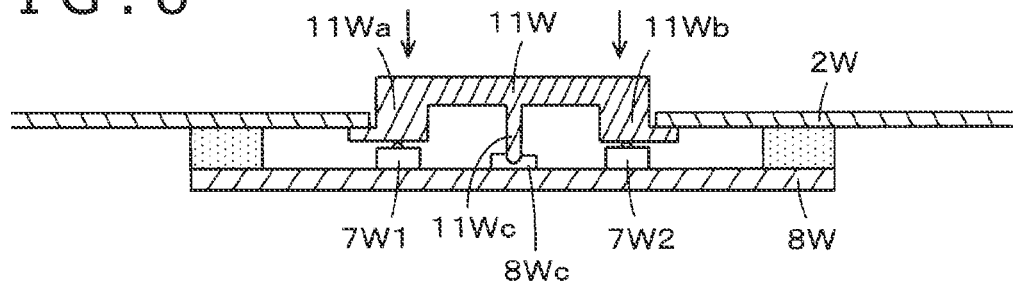
FIG. 8 is a diagram for describing a configuration example of part of a position indicator according to another embodiment of the disclosure.

FIG. 8 is a cross-sectional view of parts for describing the parts in an example of the configuration of using one seesaw operation portion to turn on and off the two side switches. As illustrated in FIG. 8, an opening 2Wd with a long hole is formed on an intermediate part along the axial direction of a housing 2W of the position indicator, and a seesaw operation portion 11W protruding from the opening 2Wd to allow operation by the user is provided in the example. A circuit board 8W is provided inside the opening 2Wd of the housing 2W, and a bearing 8Wc of a support shaft 11Wc of the seesaw movement of the seesaw operation portion 11W is provided on the circuit board 8W.

As illustrated in FIG. 8, two side switches 7W1 and 7W2 are provided at different positions in the longitudinal direction (axial direction) on the circuit board 8W, and the seesaw operation portion 11W capable of seesaw movement is used to turn on and off the two side switches 7W1 and 7W2. That is, a pressing portion 11Wa for pressing the side switch 7W1 is formed on one end portion of the seesaw operation portion 11W in the longitudinal direction, and a pressing portion 11Wb for pressing the side switch 7W2 is formed on another end portion in the longitudinal direction. Thus, the user can press the pressing portion 11Wa as indicated by an arrow in FIG. 8 to turn on the side switch 7W1 and can press the pressing portion 11Wb as indicated by an arrow to turn on the side switch 7W2.

Next, examples of the configuration of the part for changing the resonant frequency of the first resonant circuit of the electronic pen body as an example of the position indicator cartridge or the eraser body in the case of, for example, the two side switches 7W1 and 7W2 in the example of FIG. 8 will be described with reference to FIGS. 9A to 9C.

Figure 9A:
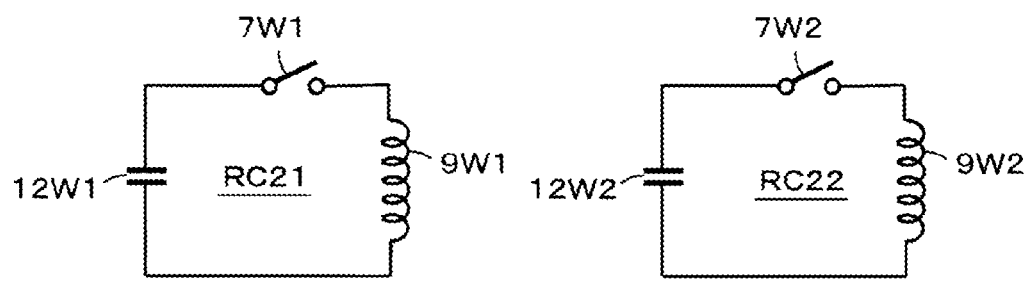
FIGS. 9A to 9C are diagrams for describing a circuit configuration example of parts of a position indicator according to another embodiment of the disclosure.

FIG. 9A depicts a first example, and two coils 9W1 and 9W2 are provided as second coils in the first example. The two coils 9W1 and 9W2 may be provided in the hollow portion of the housing 2W as in the first embodiment or may be provided on the outer circumference of the housing 2W. One of the two coils 9W1 and 9W2 may be provided in the hollow portion of the housing 2, and the other may be provided on the outer circumference of the housing 2W.

In the example of FIG. 9A, two capacitors 12W1 and 12W2 are provided on the circuit board 8W. One end of the coil 9W1 and one end of the capacitor 12W1 are connected through the side switch 7W1, and another end of the coil 9W1 and another end of the capacitor 12W1 are connected. One end of the coil 9W2 and one end of the capacitor 12W2 are connected through the side switch 7W2, and another end of the coil 9W2 and another end of the capacitor 12W2 are connected.

Hence, a resonant circuit RC21 including the coil 9W1 and the capacitor 12W1 is generated when the side switch 7W1 is turned on, and the resonant frequency of the first resonant circuit of the position indicator cartridge is changed. A resonant circuit RC22 including the coil 9W2 and the capacitor 12W2 is generated when the side switch 7W2 is turned on, and the resonant frequency of the first resonant circuit of the position indicator cartridge is changed.

In this case, the resonant frequency of the resonant circuit RC21 and the resonant frequency of the resonant circuit RC22 are set to be different from each other. Accordingly, the resonant frequency of the first resonant circuit at the time when the side switch 7W1 is turned on and the resonant frequency of the first resonant circuit at the time when the side switch 7W2 is turned on are different. The position detection device side detects the difference in frequency of the reception signal from the position indicator corresponding to the difference in resonant frequency of the first resonant circuit, to thereby determine which one of the side switch 7W1 and the side switch 7W2 is turned on.

Figure 9B:
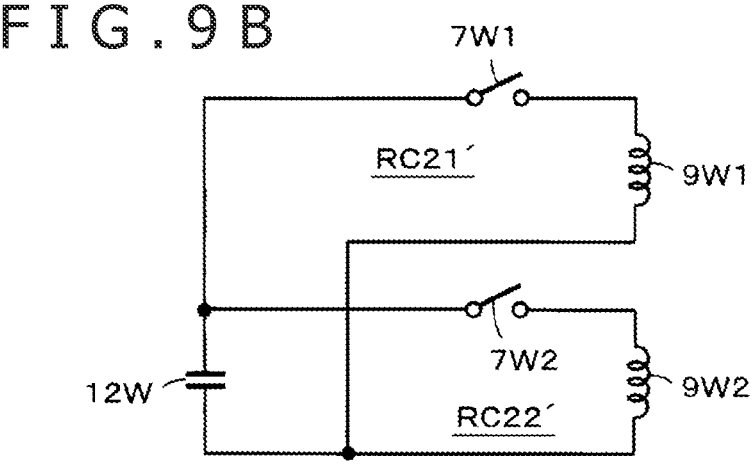

FIG. 9B depicts a second example, and the two coils 9W1 and 9W2 are also provided as second coils in the second example as in the first example. However, one capacitor 12W is provided on the circuit board 8W. One end of the coil 9W1 and one end of the capacitor 12W are connected through the side switch 7W1, and one end of the coil 9W2 and one end of the capacitor 12W are connected through the side switch 7W2. Another end of the coil 9W1 and another end of the capacitor 12W are connected, and another end of the coil 9W2 and another end of the capacitor 12W are connected.

That is, the second example is different from the first example in that the capacitor 12W is shared by the coil 9W1 and the coil 9W2, a resonant circuit RC21' including the coil 9W1 and the capacitor 12W is generated when the side switch 7W1 is turned on, and a resonant circuit RC22' including the coil 9W2 and the capacitor 12W is generated when the side switch 7W2 is turned on.

The resonant frequency of the resonant circuit RC21' and the resonant frequency of the resonant circuit RC22' are also set to be different from each other in the second example. As a result, the position detection device side can determine which one of the side switch 7W1 and the side switch 7W2 is turned on as in the first example.

Figure 9C:
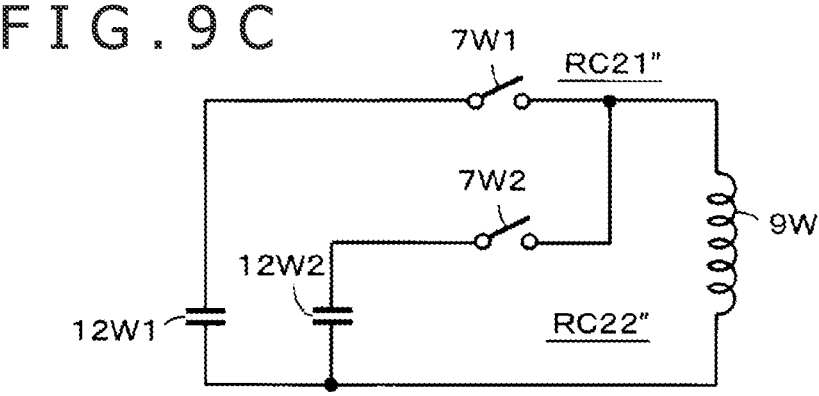

FIG. 9C depicts a third example. In the example, one second coil 9W is provided, and two capacitors 12W1 and 12W2 are provided on the circuit board 8W. One end of the coil 9W and one end of the capacitor 12W1 are connected through the side switch 7W1, and one end of the coil 9W and one end of the capacitor 12W2 are connected through the side switch 7W2. Another end of the coil 9W and other ends of the capacitor 12W1 and the capacitor 12W2 are connected.

That is, the third example is different from the first example and the second example in that the side switch 7W1 and the side switch 7W2 are used to switch the capacitor 12W1 and the capacitor 12W2 with respect to one coil 9W. In the third example, a resonant circuit RC21" including the coil 9W and the capacitor 12W1 is generated when the side switch 7W1 is turned on, and a resonant circuit RC22" including the coil 9W and the capacitor 12W2 is generated when the side switch 7W2 is turned on.

The resonant frequency of the resonant circuit RC21" and the resonant frequency of the resonant circuit RC22" are also set to be different from each other in the third example. As a result, the position detection device side can determine which one of the side switch 7W1 and the side switch 7W2 is turned on as in the first example and the second example.

Note that the number of side switches is not limited to two, and three or more side switches may be provided. The second resonant circuit with resonant frequencies different from each other may be formed as described above, and functions different from each other may be set for the three or more side switches.

Example of Side Switch Provided on Separate Housing

In the embodiments, the second coil and the circuit board including the side switch and the capacitor forming the resonant circuit together with the second coil are provided on the housing of the position indicator. However, they may be provided on a housing separate from the housing of the position indicator to form a jacket shape, and the jacket-shaped member (hereinafter, referred to as the jacket member) may be placed over the housing of the position indicator to provide a position indicator having the function of the side switch as described above.

Figure 10A:
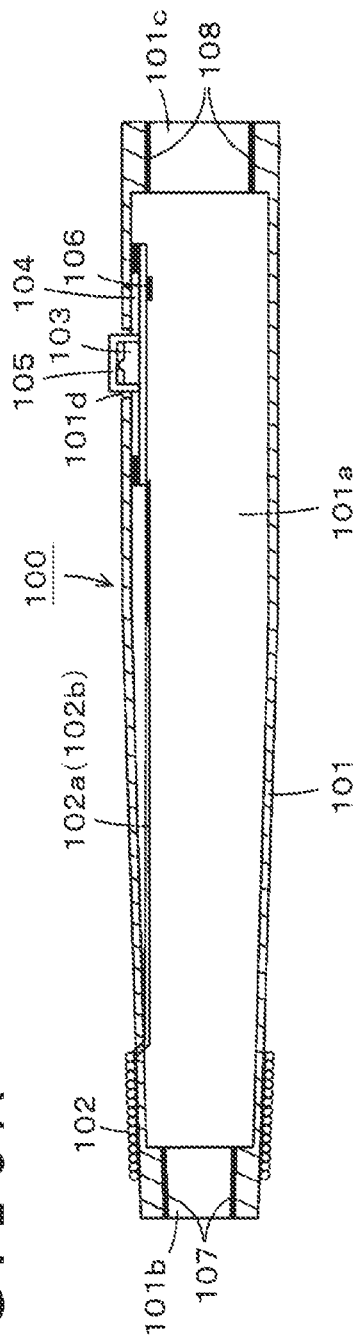
FIGS. 10A and 10B are diagrams for describing a configuration example of a position indicator according to another embodiment of the disclosure.
Figure 10B:
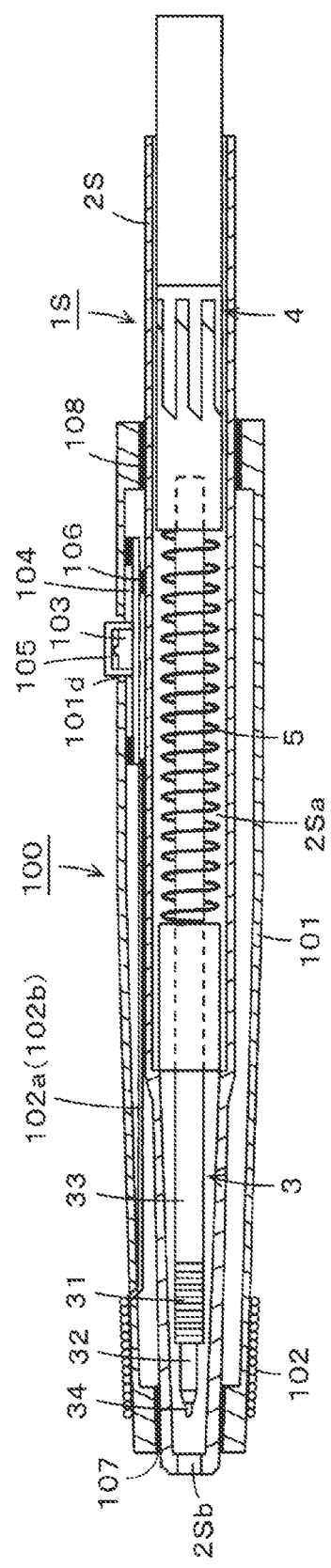

FIGS. 10A and 10B depict a configuration example of this case. FIG. 10A depicts a configuration example of a jacket member 100, and FIG. 10B illustrates a state in which the jacket member 100 is installed on an electronic pen 1S having the knock-type mechanism.

As illustrated in FIG. 10B, the electronic pen 1S includes the electronic pen body 3 as an example of the position indicator cartridge of an electromagnetic induction type housed in a hollow portion 2Sa of a housing 2S of the electronic pen 1S, and the knock-type mechanism 4 can push the electronic pen body 3 in and out from an opening 2Sb of the housing 2S, as in the electronic pens 1 and 1A of the first and second embodiments. Note that in FIG. 10B, the same reference signs are provided to constituent parts similar to the constituent parts of the electronic pens 1 and 1A of the first and second embodiments, and the description will not be repeated.

The second coil, the circuit board including the side switch and the capacitor, and the operation portion of the side switch are not provided on the housing 2S of the electronic pen 1S in the example, and the housing 2S has a configuration similar to the configuration of the housing of the knock-type ballpoint pen. That is, the housing 2S of the electronic pen 1S does not include the constituent parts for the side switch.

As illustrated in FIG. 10B, the jacket member 100 can cover at least the pen tip side of the electronic pen 1S, and the jacket member 100 can be placed over the electronic pen 1S and locked to the housing 2S of the electronic pen 1S.

The jacket member 100 includes a cylindrical jacket housing 101 containing, for example, resin as illustrated in FIGS. 10A and 10B. The inner diameter of a hollow portion 101a of the jacket housing 101 is larger than the maximum outer diameter of the electronic pen 1S. An opening 101b with the inner diameter substantially equal to the outer diameter on the pen tip side of the housing 2S of the electronic pen 1s is formed on one end side of the jacket housing 101 in the axial direction (pen tip side of electronic pen 1S). An opening 101c with the inner diameter substantially equal to the outer diameter on the back end side of the housing 2S of the electronic pen 1s is formed on another end side of the jacket housing 101 in the axial direction (back end side of electronic pen 1S). A second coil 102 is wound around an outer circumference on the opening 101b side of the jacket housing 101. An opening 101d for an operation portion 105 for pressing a side switch 103 is formed on a side circumferential surface of the jacket housing 101, at a position on the back end side in the axial direction. A circuit board 104 is arranged at a position covering the range of the presence of the opening 101d on the inner surface of the jacket housing 101, and an adhesive member (not illustrated), such as a double-sided tape, is used to bond the circuit board 104. The side switch 103 is arranged on the circuit board 104 in such a manner as to face outside from the opening 101d of the jacket housing 101, and the operation portion 105 can be used to press the side switch 103.

Both ends 102a and 102b of the second coil 102 are introduced into the hollow portion 101a of the jacket housing 101 through a through hole not illustrated, and the ends 102a and 102b are connected to the circuit board 104. In the circuit board 104, the second coil 102 is connected to a capacitor 106 provided on the circuit board 104 through the side switch 103, and a resonant circuit including the second coil 102 and the capacitor 106 is formed when the side switch 103 is turned on.

From the pen tip side, the electronic pen 1S is inserted into the hollow portion 101a of the jacket housing 101 of the jacket member 100 through the opening 101c on the back end side of the jacket member 100 configured in this way, and the jacket member 100 is placed over the electronic pen 1S. The jacket member 100 is locked to the housing 2S of the electronic pen 1S in the state illustrated in FIG. 10B.

In the example, elastic locking members 107 and 108 containing, for example, elastic rubber are provided on the inner circumferential surface of the opening 101b of the jacket housing 101 and the inner circumferential surface of the opening 101c, and the jacket member 100 is surely locked to the electronic pen 1S owing to the elastic friction between the elastic locking members 107 and 108 and the outer circumferential surface of the housing 2S of the electronic pen 1S.

The resonant circuit including the second coil 102 and the capacitor 106 is not generated when the operation portion 105 of the jacket member 100 is not operated and the side switch 103 is off in the state illustrated in FIG. 10B, and the resonant frequency of the first resonant circuit including the first coil 31 and the capacitor 37 of the electronic pen body 3 of the electronic pen 1S is the first frequency f1 determined by the first coil 31 and the capacitor 37.

On the other hand, the side switch 103 is turned on when the operation portion 105 of the jacket member 100 is pressed, and a resonant circuit including the second coil 102 and the capacitor 106 is formed as a closed circuit. Consequently, mutual induction occurs between the first coil 31 of the first resonant circuit and the second coil 102, and the resonant frequency of the first resonant circuit is a second resonant frequency different from the first resonant frequency.

Hence, the position detection device side can also detect the change in frequency of the reception signal corresponding to the difference in resonant frequency of the first resonant circuit of the electronic pen body 3 as in the embodiments to thereby detect on/off of the side switch in relation to the electronic pen 1S provided with the jacket member 100 of the example.

In this way, the jacket member 100 can be placed over the electronic pen 1S not including the side switch, and the electronic pen 1S can perform an operation similar to the operation of the electronic pen 1S provided with the side switch.

That is, the configuration of the electronic pen not including the side switch is not changed at all, and it is only necessary to place the jacket member over the electronic pen in the example. Hence, the owner of the electronic pen not including the side switch can purchase the jacket member and place the jacket member over the electronic pen to realize the electronic pen including the side switch. This is very convenient.

Although the jacket member 100 of the example is provided with the second coil being wound around the outer circumference of the jacket housing 101, the second coil may be provided in the hollow portion 101a of the jacket housing 101, at a position where the second coil can be magnetically coupled to the first coil 31 of the electronic pen body 3, as in the first embodiment.

Although the second coil 102 is wound such that the axial direction of the cylindrical jacket housing 101 is the winding center direction, the second coil 102 may be provided such that a direction crossing the axial direction of the cylindrical jacket housing 101 is the winding center.

Figure 11:
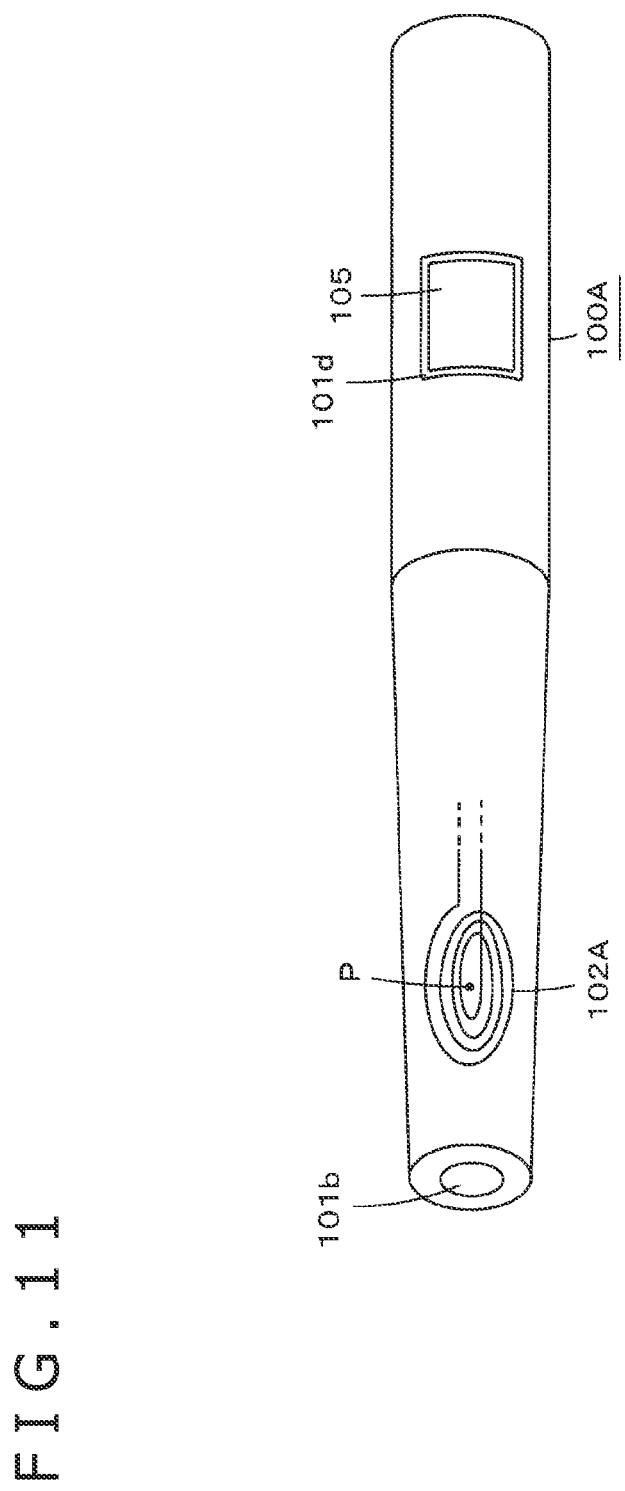
FIG. 11 is a diagram for describing a configuration example of a position indicator according to another embodiment of the disclosure.

That is, as illustrated, for example, in FIG. 11, a conductor line included in a coil 102A may be wound along the curved surface of the side circumferential surface of the jacket housing 101 on the side circumferential surface on the opening 101b side of the jacket housing 101, with one point P of the side circumferential surface of the jacket housing 101 as the winding center, to thereby form the coil 102A. In this case, the side circumferential surface provided with the coil 102A is not parallel to the axial direction of the jacket housing 101, and the side circumferential surface is tilted to become thinner toward the pen tip. The second coils 9, 9A, 9M, and 9ER in the first to fourth embodiments can also be modified in similar ways.

The jacket member may also include a plurality of side switches described with reference to FIGS. 8 and 9A to 9C.

The electronic pen provided with the jacket member may be an electronic pen with a configuration similar to the configuration of the multi-color ballpoint pen as in the third embodiment or may be an electronic pen not including the knock-type mechanism but including the electronic pen body in the housing. The jacket member can also be applied to the electronic eraser.

Other Examples

In the embodiments, the second resonant circuit including the capacitor connected to the second coil through the side switch is used in order to cause the side switch to change the resonant frequency of the first resonant circuit of the position indicator cartridge. However, both ends of the second coil may be connected through the side switch without forming the second resonant circuit. Both ends of the second coil may be connected to each other through the side switch to form a closed circuit when the side switch is turned on. In this way, the coil of the first resonant circuit and the second coil may be mutually induced to change the resonant frequency of the first resonant circuit.

However, when the generation of the closed circuit of the second resonant circuit is controlled by turning on and off of the side switch as in the embodiments, the change in resonant frequency of the first resonant circuit can easily be set, and there is an advantageous effect that the position detection device side can surely detect the operation state of on/off of the side switch.

Although the side switch is a self-return switch in the examples of the embodiments, the side switch is not limited to the self-return switch, and it is obvious that any switch can be used.

In the description of the electronic pens as embodiments of the position indicator, each electronic pen includes the knock-type mechanism, and the knock operation is performed to push the front end portion of the electronic pen body as an example of the position indicator cartridge in and out from the opening of the housing of the electronic pen. However, it is obvious that the disclosure can also be applied to a case in which the electronic pen does not include the knock-type mechanism, and the front end portion of the electronic pen body protruding from the opening of the housing is held in the housing in this state.

It is to be noted that the embodiment of the present disclosure is not limited to the foregoing embodiment, and that various changes can be made without departing from the spirit of the present disclosure.

The invention claimed is:

1. A position indicator of an electromagnetic induction type comprising:
 a position indicator cartridge housed in a hollow portion of a first housing, wherein the position indicator cartridge includes a first resonant circuit including a first coil wound around a magnetic core arranged on one end of the position indicator cartridge in an axial direction of the position indicator cartridge and a first capacitor,
 a second coil that is independent of the position indicator cartridge provided outside of the position indicator cartridge, at a position where the second coil, in operation, is magnetically coupled to the first coil of the position indicator cartridge, and
 a switch turned on and off by an operation portion provided outside of the position indicator cartridge, wherein the operation portion, in operation, receives an operation made by a user, and wherein a closed circuit including the second coil is formed when the switch is turned on.

2. The position indicator according to claim 1, wherein the closed circuit formed when the switch is turned on is a second resonant circuit formed by connecting a second capacitor to the second coil.

3. The position indicator according to claim 1, wherein:
 the first housing has a cylindrical shape and includes an opening adjacent to the one end of the position indicator cartridge in the axial direction of the position indicator cartridge, and
 the first housing includes a knock-type mechanism that pushes a front end portion on the one end of the position indicator cartridge in the axial direction of the position indicator cartridge in and out from the opening.

4. The position indicator according to claim 3, wherein the knock-type mechanism includes a mechanism corresponding to a knock-type multi-color ballpoint pen, and the position indicator cartridge includes a plurality of position indicator cartridges installed on the knock-type mechanism.

5. The position indicator according to claim 4, wherein the second coil, the switch, and the operation portion are used in common for the plurality of position indicator cartridges.

6. The position indicator according to claim 1, wherein:
 a circuit board is arranged outside of the position indicator cartridge along the axial direction of the position indicator cartridge, and
 the switch is provided on the circuit board, and the operation portion is exposed to allow operation of the switch from outside of the position indicator through an opening provided on the first housing.

7. The position indicator according to claim 1, wherein the second coil surrounds at least part of the magnetic core of the position indicator cartridge.

8. The position indicator according to claim 1, wherein the second coil is inside of the first housing.

9. The position indicator according to claim 1, wherein the second coil is outside of the first housing.

10. The position indicator according to claim 1, wherein the position indicator cartridge includes a pressure detector which, in operation, detects pressure applied to a front end portion on the one end of the position indicator cartridge in the axial direction of the position indicator cartridge, and the position indicator cartridge, in operation, transmits, through the first resonant circuit, a position indication signal and information regarding the pressure detected by the pressure detector.

11. The position indicator according to claim 1, wherein the second coil includes a plurality of second coils, and the switch includes a plurality of switches that generate the closed circuit for the plurality of second coils and are provided in association with the plurality of second coils.

12. The position indicator according to claim 11, wherein:
 the closed circuit generated when one or more of the plurality of switches is turned on is a second resonant circuit formed by connecting a second capacitor to one or more of the plurality of second coils, and
 the second capacitor is used in common for the plurality of second coils.

13. The position indicator according to claim 11, wherein:
 the closed circuit generated when one or more of the switches is turned on is a second resonant circuit formed by connecting a second capacitor to one or more of the plurality of second coils, and
 a plurality of the second capacitors different from each other is provided on the plurality of second coils, respectively.

14. The position indicator according to claim 1, wherein:
 the second coil includes a plurality of second coils,
 the switch includes a plurality of switches,
 the closed circuit is generated when one or more of the plurality of switches is turned on is a second resonant circuit formed by connecting one or more of a plurality of second capacitors to one or more of the plurality of second coils,
 each of the plurality of second capacitors is connected to the second coil through each of the plurality of switches,
 each of the plurality of switches is turned on and off through the operation of the operation portion, and
 one of the plurality of second capacitors connected to one of the plurality of second coils is changed according to the switch turned on by the operation of the operation portion, and the second resonant circuit is switched.

15. The position indicator according to claim 1, wherein:
 the second coil, the operation portion, and the closed circuit formed when the switch is turned on to apply a current to the second coil are provided on a second housing that is separate from the first housing, and
 the first housing that houses the position indicator cartridge is inserted into the second housing such that the first coil of the position indicator cartridge and the second coil, in operation, are magnetically coupled.

16. The position indicator according to claim 15, wherein the second housing and the first housing that houses the position indicator cartridge insertable and removable with respect to each other.

* * * * *